United States Patent [19]

Seike et al.

[11] Patent Number: 5,168,838
[45] Date of Patent: Dec. 8, 1992

[54] ENGINE INDUCTION SYSTEM

[75] Inventors: Shinji Seike, Higashihiroshima; Hironobu Hashimoto, Kure; Takashige Ishikawa, Hiroshima, all of Japan

[73] Assignee: Mazda Motor Corporation, Hiroshima, Japan

[21] Appl. No.: 781,406

[22] Filed: Oct. 23, 1991

[30] Foreign Application Priority Data

| Oct. 29, 1990 | [JP] | Japan | 2-293304 |
| Nov. 5, 1990 | [JP] | Japan | 2-300201 |
| Nov. 5, 1990 | [JP] | Japan | 2-300202 |
| Jan. 31, 1991 | [JP] | Japan | 3-010938 |
| Jan. 31, 1991 | [JP] | Japan | 3-010946 |

[51] Int. Cl.⁵ .......................................... F02M 35/10
[52] U.S. Cl. ............................................. 123/52 MV
[58] Field of Search ......... 123/52 M, 52 MV, 52 MB, 123/52 MC

[56] References Cited

U.S. PATENT DOCUMENTS

| 4,641,610 | 2/1987 | Rutschmann | 123/52 MV |
| 4,829,941 | 5/1989 | Hitomi et al. | 123/52 MV |
| 4,858,570 | 8/1989 | Matsumoto et al. | 123/52 MV |
| 4,977,865 | 12/1990 | Hiraoka et al. | 123/52 MB |
| 4,989,553 | 2/1991 | Ueda et al. | 123/52 MV |
| 5,063,899 | 11/1991 | Hitomi et al. | 123/52 MV |
| 5,081,962 | 1/1992 | Kurokawa et al. | 123/52 MV |
| 5,085,178 | 2/1992 | Hitomi et al. | 123/52 MV |

FOREIGN PATENT DOCUMENTS

| 0223378 | 5/1987 | European Pat. Off. | |
| 0352820 | 1/1990 | European Pat. Off. | |
| 0365016 | 4/1990 | European Pat. Off. | |
| 0102322 | 4/1990 | Japan | 123/52 M |
| 0119619 | 5/1990 | Japan | 123/52 M |
| 0259229 | 10/1990 | Japan | 123/52 MV |

Primary Examiner—David A. Okonsky
Attorney, Agent, or Firm—Fish & Richardson

[57] ABSTRACT

An induction system for use in a V-shaped engine having a forward bank and a rearward bank each provided with a row of cylinders, the induction system includes intake runners individually extending from the cylinders of each bank, the intake runners being convergedly connected at upstream end portions respectively. To upstream ends of thus converged connection portions are connected common intake passages, which are connected to a junction portion at a further upstream side, whereby the respective common intake passages are connected. The lengths of the intake runners from the cylinders up to a center of the converged connection portion are set equal to one another. The respective converged connection portions are arranged vertically above the rearward bank. A communicating passage is provided for communicating the center portions of the respective converged connection portions with each other. In the communicating passage is provided a valve for opening or closing the communicating passage according to an engine speed. In this induction system, the dynamic effects of induction can be efficiently utilized in a wide range of engine speed in a relatively simplified construction. In addition, an intake manifold can be arranged in such a manner as to make the size of the engine smaller.

18 Claims, 8 Drawing Sheets

ENGINE INDUCTION SYSTEM

BACKGROUND OF THE INVENTION AND PRIOR ART STATEMENT

This invention relates to an induction system for use in a multi-cylinder engine, more particularly to an engine induction system for use in an engine having a plurality of rows of cylinders in which intake runners extending from respective cylinders in each cylinder row are connected convergedly to a convergent portion.

Conventionally, various methods have been proposed for increasing the charging efficiency of an induction system so as to obtain higher power output of an engine. There is known a method for supercharging the intake air into cylinders by utilizing dynamic effects of induction such as resonance effect and inertia effect in the induction system as one of those methods.

For example, Unexamined Japanese Patent Publication No. 62-101820 discloses an induction system having the following construction: The induction system is incorporated into an engine having two rows of cylinders. An individual chamber serving as a collecting portion to which upstream ends of the intake runners are connected is provided in correspondence in each cylinder row. Two intake runners extends individually from each cylinder to the respective chambers, one intake runner being short and the other being long. The respective chambers are arranged between the cylinder rows, and a communicating passage is provided with one end thereof connected to one chamber and the other end thereof connected to the other chamber so as to communicate the respective chambers with each other. Further, two types of valves are disposed so as to open the respective intake runners and the communicating passage respectively. The dynamic effects of induction can be made use of in a wide range of engine speed by opening or closing the respective valves in an appropriate manner.

Further, Unexamined Japanese Utility Model Publication No. 60-88062 discloses an engine induction system in which intake runners extending individually from respective cylinders are connected to a convergent portion at upstream end thereof in such a manner that the lengths of the respective intake runners are equal to one another. As a result, the engine induction system demonstrates an improved distributivity of the intake air into the respective cylinders, and improved and uniform dynamic effects in the respective cylinders.

As an induction system for use in a V-shaped engine, Unexamined Japanese Utility Model Publication No. 2-54359 discloses the one in which respective intake runners extending individually from each bank are connected to a connecting portion including a surge tank. The connecting portions provided for the respective two banks are arranged above one of the bank with upstream portions thereof being connected to each other. Further, Unexamined Japanese Patent Publication No. 62-153516 discloses an induction system in which a surge tank having a large volume is horizontally partitioned into an upper chamber and a lower chamber. Upstream ends of respective intake runners extending individually from one bank are connected to the upper chamber while those of respective intake runners extending individually from the other bank being connected to the lower chamber. Upstream ends of the respective chambers are connected to common intake passages, which are connected to each other at a further upstream side.

In the case where the intake runners having the lengths equal to one another as disclosed in Unexamined Japanese Utility Model Publication No. 60-88062 are used in an engine having a plurality of cylinder rows as disclosed in Unexamined Japanese Patent Publication No. 62-101820, the following thing is required. Since there are generally provided many cylinders in such an engine, a connecting portion corresponding to each cylinder row is required to be small. In this case, if the respective small size connecting portions are arranged between the cylinder rows, it causes the connecting portions and the corresponding cylinders to be positioned closer relative to each other, with the result that the intake runners extending from the respective cylinders become shorter.

However, the intake runners cannot be made smaller in diameter thereof since it is necessary to assure a predetermined flow rate of the intake air in the respective cylinders. Accordingly, in the case where the individual intake runners are shortened, an engine speed region in which the maximum resonance effect or inertia effect can be obtained shifts to a higher level. However, there are some cases where such an effective engine speed region exceeds actual engine speed region of an engine used in a general passenger vehicle. In view thereof, it is necessary to assuredly give each intake runners the substantial length. However, this causes the small size connecting portions to be moved upward in view of layout thereof in the induction system where the small size connecting portions are arranged between the cylinder rows. Consequently, the height of the engine increases, which deters the construction of the engine having a smaller size.

On the other hand, if the respective small size connecting portion are arranged above the one of the cylinder rows, the above problem may be solved. However, there is yet room for improvement in making the size of the induction system smaller while making the lengths of the respective intake runners equal to one another and utilizing the dynamic effects in a wide range of engine speed, facilitating an assembling operation of an intake manifold to an engine main body, and the like.

Further, in an induction system in which collecting portions constituted by surge tanks having a relatively large volume and provided for the respective banks are arranged above one of the banks, it is difficult to make the size of the induction system sufficiently small. Also, if an intake manifold including the respective intake runners and connecting portions is integrally formed, it is difficult to perform such operations as to fix the intake manifold to a cylinder head while supporting it. Further, it still remains as a problem to facilitate assembling of the intake manifold to the engine main body.

SUMMARY OF THE INVENTION

It is a primary object of the present invention to provide an induction system for use in an engine including a plurality of cylinder rows, each cylinder row having a plurality of cylinders, in which a convergent portion is provided to which upstream ends of intake runners extending individually from the respective cylinders of each cylinder row and having the lengths equal to one another are connected, so that dynamic effects of induction are effectively utilized in a wide range of engine speed in a relatively simple construction while arranging an intake manifold appropriately so as to make the size of the engine smaller.

It is another object of the present invention to provide an induction system for use in an engine comprising an intake manifold which has sufficient rigidity and can be assembled to an engine main body more easily.

Accordingly, the invention is directed at an induction system for use in an engine including a plurality of rows of cylinders, the induction system comprising intake runners individually extending from the respective cylinders, convergent portions respectively provided for the plurality of cylinder rows, the convergent portion being adapted for connecting the intake runners connected to the respective cylinders of each row in a substantially convergent form with the same distance being held between a center of the convergent portion and the cylinders to which the intake runners are respectively connected, and the convergent portions being arranged above one of the plurality of cylinder rows, common intake passages respectively connected to the convergent portions corresponding to the plurality cylinder rows, a junction portion for connecting the common intake passages, a communicating passage for communicating the convergent portions with each other, and a valve provided in the communicating passage for opening or closing the communicating passage according to an engine speed.

In this construction, the respective convergent portions are arranged above the portion of the engine where one cylinder row is provided. This assuredly enables the intake runners to have the lengths sufficient to obtain the dynamic effects of induction while suppressing the height of the engine. Further, the respective convergent portions are proximate to each other, and therefore the common intake passages leading from the convergent portions extends proximately to each other. Accordingly, the common intake passages do not unecessarily take up much space, making the size of an intake manifold smaller. Conseqently, the size of the engine can be made smaller.

Moreover, the communicating passage is provided for communicating the center portions of the convergent portions corresponding to the respective cylinder rows with each other, and the valve is provided in the communicating passage for opening or closing the communicating passage according to the engine speed. The valve is brought into its closed state in a low or a medium engine speed region. Accordingly, the passage structure from the intake runners to the common intake passages serve as a resonance space with using the junction portion as a pressure inverting portion, whereby the intake air can be supercharged into the respective cylinders due to the resonance effect in the low or medium engine speed region. On the other hand, the valve is brought into its open state to communicate the respective convergent portions with each other in a high engine speed region. Accordingly, the passage structure from the intake runners to the respective convergent portions serve as a resonance space with using openings defined in the convergent portions and in communication with the communicating passage as a pressure inverting portion, whereby the intake air can be supercharged into the respective cylinders due to the resonance effect in the high engine speed region.

Further, the inertia effect can also be obtained by using the openings of the convergent portions as a pressure inverting portion. Accordingly, the intake air can be supercharged into the respective cylinders due to the inertia effect as well in the high engine speed region. In this way, the intake air can be supercharged into the cylinders effectively due to the dynamic effects of induction.

Further, the invention is directed at an induction system for use in a V-shaped engine including two banks each having a row of cylinders and mounted in a vehicle body with a crank shaft thereof extending in a widthwise direction of the vehicle body and the first bank positioned forward relative to the second bank, the convergent portions respectively corresponding to the cylinder rows of the first and second banks are vertically arranged above the second bank with the convergent portion corresponding to the cylinder row of the first bank positioned above the convergent portion corresponding to the cylinder row of the second bank, and the communicating passage for communicating the convergent portions is L-shaped.

In this construction, the induction system is used for the V-shaped engine mounted in an engine compartment of a vehicle with the crank shaft extending in the widthwise drection of the vehicle body. The respective convergent portions are vertically arranged above the rearward bank with the convergent portion corresponding to the forward bank positioned above the one corresponding to the rearward bank. Accordingly, the dead space between the rearward bank and a bonnet in the engine compartment can be effectively utilized with assuring the respective intake runners to have sufficient lengths while suppressing the height of the engine along a contour line of the bonnet. Furthermore, the communicating passage for communicating the respective convergent portions is L-shaped. This facilitates assembling of the communicating passage to the respective convergent portions.

Furthermore, the invention is directed at an induction system for use in a V-shaped engine including a first bank provided with a row of cylinders and a second bank provided with a row of cylinders, the induction system comprising a first manifold member, and a second manifold member separably coupled to the first manifold, the manifold member including intake runners individually extending from the respective cylinders provided in the first bank, and a first downstream connection portion for connecting the intake runners connected to the first bank, the intake runners and the first downstream connection portion being integrally formed, and the second manifold member including intake runners individually extending from the respective cylinders provided in the second bank, a second downstream connection portion for connecting the intake runners connected to the second bank, and an upstream connection portion for connecting the first downstream connection portion and the second downstream connection portion, the intake runners, the second downstream connection portion, and the upstream connection portion being integrally formed, the first manifold member being arranged above the second manifold member, and the first downstream connection portion, the second downstream connection portion, and the upstream connection portion being arranged above the second bank.

In this construction, the first manifold member and the second manifold member separably coupled to the first manifold member are provided. The first manifold member includes intake runners corresponding to the first bank, and the first downstream connection portion for connecting the first intake runners. The second manifold member includes intake runners corresponding to the second bank, the second downstream connection portion for connecting the second intake runners, and the upstream connection portion for connecting the first and second downstream connection portions. The first manifold member is arranged above the second manifold member. Also, the first and second downstream connection portion and the upstream connection portion are arranged above the second bank. Accordingly, the intake runners can have the lengths sufficient to obtain the dynamic effects of induction while suppressing the height of the engine, which thus enabling the size of the engine smaller. Also, the induction system can be constructed by separate light manifold members, which thus making the incorporation of the induction system to the engine easier.

Furthermore, the invention is directed at an induction system for use in a V-shaped engine including a first bank provided with a row of cylinders and a second bank provided with a row of cylinders, the induction system comprising, intake runners individually extending from the respective cylinders provided in the first bank, a first convergent portion for connecting the intake runners connected to the first bank in a convergent form, a first common intake passage connected to the first convergent portion, intake runners individually extending from the respective cylinders provided in the second bank, a second convergent portion for connecting the intake runners connected to the second bank in a convergent form, a second common intake passage connected to the second convergent portion, a junction portion for connecting the first and second common intake passages, the first and second convergent portions being arranged above the first bank with the second convergent portion underlying the first convergent portion.

In this construction, intake runners extending from the first and second banks of the V-shaped engine are respectively connected to a first and a second convergent portions. the respective convergent portions are vertically arranged above the first bank with the second convergent portion underlying the first convergent portion. Thus, the induction system is made smaller while assuring the passage length enough for obtaining the resonance effect. Also, the intake runners extending from the cylinders provided in the respective banks are rendered to have the substantially same length, thereby being uniformly subjected to the resonance effect. Consequently, the resonance effect can be maximally utilized in the induction system.

Furthermore, the invention is directed at an induction system for use in a V-shaped engine including a first bank provided with a row of cylinders and a second bank provided with a row of cylinders, the induction system comprising, intake runners individually extending from the respective cylinders provided in the first bank, a first connection portion for connecting the intake runners connected to the first bank, a first common intake passage connected to the first connection portion, intake runners individually extending from the respective cylinders provided in the second bank, a second connection portion for connecting the intake runners connected to the second bank, a second common intake passage connected to the second connection portion, a junction portion for connecting the first and second common intake passages, a throttle body connected to an upstream portion end of the junction portion, the first and second connection portions being arranged above the first bank, the throttle body being arranged in the vicinity of a space between the first and second banks with the first and second common intake passages being curved substantially along an outside of the first bank.

In this construction, the respective connection portions corresponding to the first and second banks are arranged above the first bank, and the first and second common intake passages portion comprising common intake passages being curved substantially along an outside of the first bank toward the space between the banks. The throttle body connected to the upstream end of the junction portion is arranged near the space between the banks. Accordingly, the first and second common intake passages are assured to have the length sufficient to obtain the efficient resonance effect. Moreover, the induction system can be laid out near the banks in a compact manner. Consequently, the induction system can be easily accommodated in the engine compartment.

Furthermore, the invention is directed at an induction system for use in an engine including a first cylinder row having a plurality of cylinders whose intake strokes are not serially continuous one after another and a second cylinder row having a plurality of cylinders whose intake strokes are not serially continuous one after another, the induction system comprising, intake runners individually extending from the respective cylinders of the first cylinder row, a first connection portion for connecting the intake runners extending from the first cylinder row, a first common intake passage connected to the first connection portion, intake runners individually extending from the respective cylinders of the second cylinder row, a second connection portion for connecting the intake runners extending from the second row, a second common intake passage connected to the second connection portion, a communicating passage for communicating the first and second connection portions with each other, a first valve provided in the communicating passage for opening or closing the communicating passage to perform a first communicating change, a bypass passage for bypassing the first valve, and a second valve provided in the bypass passage for opening or closing the bypass passage to perform a second communicating change.

In this construction, the first and second communicating changes are provided to change communication of the first and second connection portions corresponding to the respective banks. The first communication change is performed by the first valve provided in the communicating passage. The second communicating change is performed by the second valve provided in the bypass passage. Accordingly, the effective intake passage length is variable in steps and the resonance effect can be obtained in various engine speed regions. In addition, the first and the second communicating changes enables the reduction of the pressure loss and resistance in the intake air flow. Therefore, the charging efficiency can be effectively improved and the engine output can be enhanced.

These and other objects, features and advantages of the present invention will become more apparent upon a reading of the following detailed description and accompanying drawings.

DETAILED DESCRIPTION OF PREFERRED EMBODIMENT OF THE INVENTION

A first embodiment of the present invention will be described with reference to FIGS. 1 to 5.

Figure 1:
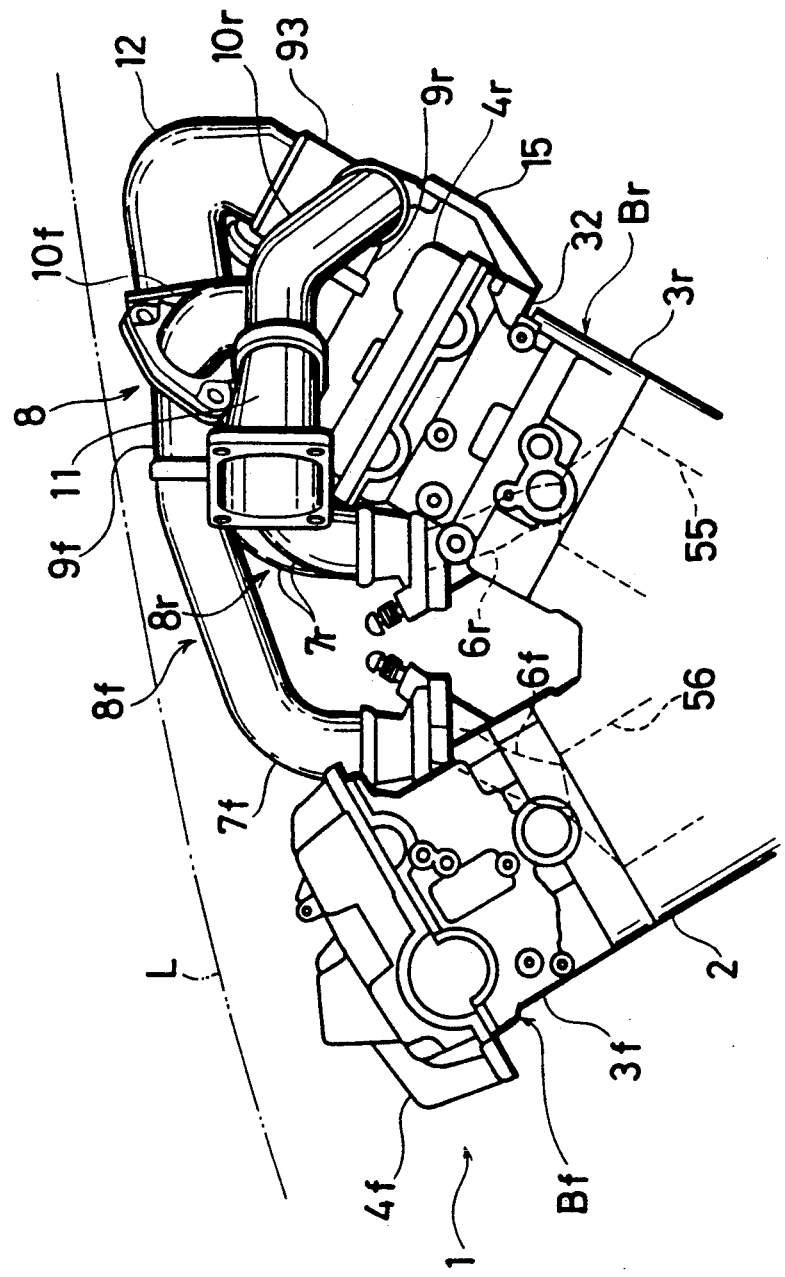
FIG. 1 is a side view showing an overall construction of an engine induction system incorporating the present invention as a first embodiment.
Figure 2:
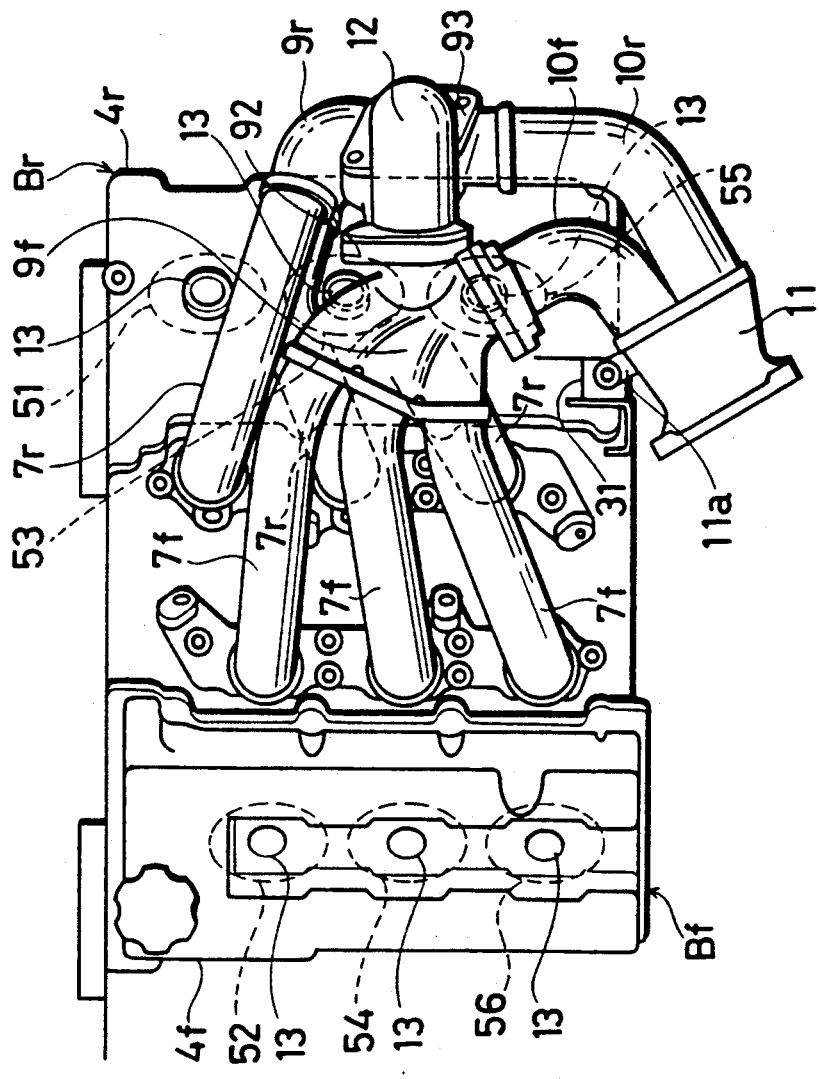
FIG. 2 is a plan view showing the overall construction of the first engine induction system.

FIGS. 1 and 2 show an overall construction of an engine induction system embodying the invention as a first embodiment respectively. Indicated at 1 is a main body of a V-shaped six-cylinder engine mounted in a vehicle body transversely to the lengthwise direction of the vehicle with an unillustrated crank shaft extending in a widthwise direction (a vertical direction in the plane of the drawing in FIG. 2) of a vehicle. The engine main body 1 has a pair of banks, a forward bank Bf and a rearward bank Br, opposing to each other in a lengthwise direction of the vehicle. Hereinafter, subscripts f and r used in reference numerals denote elements in connection with the forward bank Bf and the rearward bank Br respectively. The engine main body 1 comprises a cylinder block 2 having a substantially V-shaped cross-section, a forward cylinder head 3f and a rearward cylinder head 3r mounted respectively on a forward upper surface and a rearward upper surface of the cylinder block 2, and a forward cylinder head cover 4f and a rearward cylinder head cover 4r mounted respectively on the upper surfaces of the forward and the rearward cylinder heads 3f, 3r.

In the forward bank Bf are defined a forward row of three cylinders, namely a second cylinder 52, a fourth cylinder 54, and a sixth cylinder 56 with arranged in series in a lengthwise direction of the bank Bf.

Further, in the rearward bank Br are defined a rearward row of three cylinders, namely a first cylinder 51, a third cylinder 53, and a fifth cylinder 55 similarly arranged to those in the forward bank Bf. On a rearward side surface (a side surface opposing to the rearward cylinder head 3r) of the forward cylinder head 3f are defined three first inlet ports 6f whose downstream ends are in communication with the respective cylinders 52, 54, and 56 in the forward bank Bf. Similarly, on a forward side surface (a side surface opposing to the forward cylinder head 3f) of the rearward cylinder head 3r are defined three second inlet ports 6r whose downstream ends are in communication with the respective cylinders 51, 53 and 55 in the rearward bank Br.

To the respective first inlet ports 6f are connected downstream ends of three first intake runners 7f. To the respective second inlet ports 6r are connected downstream ends of three second intake runners 7r. Upstream ends of the first intake runners 7f and those of the second intake runners 7r are convergedly connected to a first and a second convergent portions 9f, 9r respectively in such a manner that the respective intake runners connected to the same convergent portion have the same length.

To the convergent portions 9f, 9r are connected downstream ends of a first and a second common intake passages 10f, 10r respectively. Upstream ends of the common intake passages 10f, 10r are connected to a junction portion 11 located further upstream, whereby to be connected to each other. The intake runners 7f, 7r, convergent portions 9f, 9r, common intake passages 10f, 10r, and junction portion 11 constitute an intake manifold 8. The intake manifold 8 is arranged between the engine main body 1 and a bonnet line L representative of a lower surface of a bonnet of the vehicle body.

The convergent portions 9f, 9r corresponding respectively to the forward and the rearward banks Bf, Br are both disposed above the rearward bank Br. Specifically, the first convergent portion 9f corresponding to the forward bank Bf is disposed above a forward end of the rearward cylinder head cover 4r of the rearward bank Br. The second convergent portion 9r corresponding to the rearward bank Br is disposed above a rearward end of the cylinder head cover 4r of the rearward bank Br with positioned at a lower level than the first convergent portion 9f.

The forward cylinder row of the forward bank Bf and the rearward cylinder row of the rearward bank Br are offset to each other in a direction of extension of the crank shaft by a predetermined amount. The first convergent portion 9f and the second convergent portion 9r are also offset to each other in the crank shaft extension direction. The offset amount of the convergent portions 9f, 9r is set smaller than that of the cylinder rows, so that the convergent portions 9f, 9r can be disposed vertically to the plane of the drawing in FIG. 2 with respective center portions thereof being positioned between the third cylinder 53 and the fifth cylinder 55 of the rearward bank Br.

Figure 4:
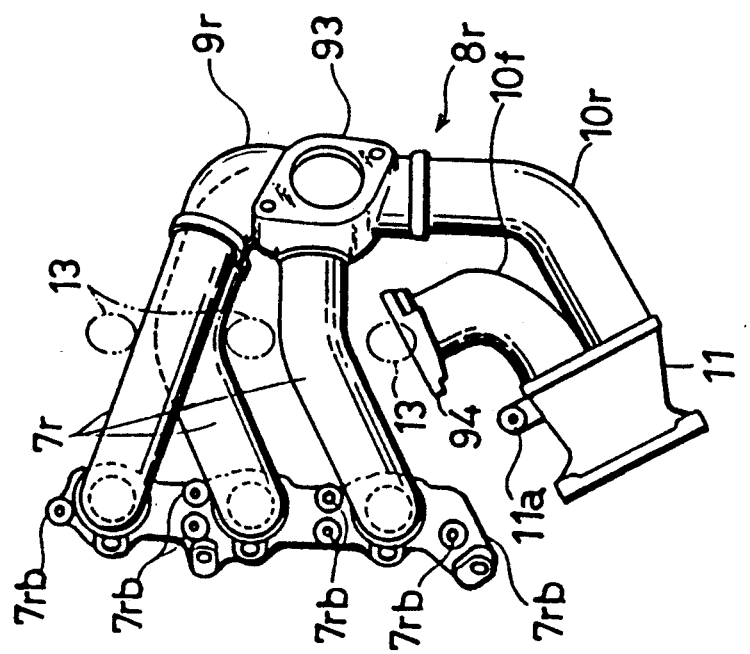
FIG. 4 is a plan view showing a second divisional manifold of the first engine induction system.
Figure 3:
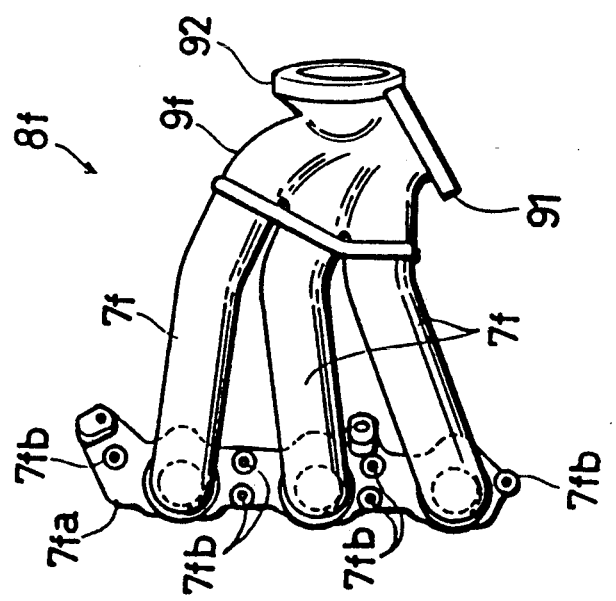
FIG. 3 is a plan view showing a first divisional manifold of the first engine induction system.

The intake manifold 8 comprises a first and a second divisional manifolds 8f, 8r respectively connected to the forward and the rearward banks Bf, Br as shown in FIGS. 3, 4. The divisional manifolds 8f, 8r are formed separately, and vertically arranged with the first divisional manifold 8f positioned above and before the second divisional manifold 8r.

The first divisional manifold 8f connected to the forward bank Bf includes the first intake runners 7f connected to the first inlet ports 6f provided for the respective cylinders defined in the forward bank Bf, and the first convergent portion 9f to which the upstream ends of the first intake runners 7f are connected as shown in FIG. 3. The first intake runners 7f and the first convergent portion 9f are integrally connected to each other, which means in this case that the first intake runners 7f and the first convergent portion 9f are inseparably connected to each other by being integrally formed by means of molding, or welded.

Accordingly, it may be appropriate that the respective intake runners 7f be formed of steel pipes or aluminum pipes, and then be welded to the first convergent portion 9f. This will be advantageous in making the first divisional manifold 8f further lighter.

A first mounting flange 7fa is formed at the downstream ends of the first intake runners 7f. The first mounting flange 7fa is adapted for connecting the first intake runners 7f to the respective first inlet ports 6a. In the first mounting flange 7fa are defined mounting screw holes 7fb through which screws are attached. The diameter of the mounting screw holes 7fb is greater than that of mounting screw holes 7rb defined in a second mounting flange 7ra of the second divisional manifold 8r to be described below. The first convergent portion 9f is provided with a coupling portion 91 for coupling the first convergent portion 9f and the first common intake passage 10f located upstream thereof. A coupling surface of the coupling portion 91 extends obliquely with respect to a lengthwise direction facing the rearward side of the vehicle body. The convergent portion 9f is further provided with a first communicating passage coupling portion 92. In the coupling portion 92 is defined an opening in communication with a center portion of the first convergent portion 9f, and facing rearward with respect to the lengthwise direction of the vehicle body.

On the other hand, the second divisional manifold 8r connected to the rearward bank Br, which is positioned below the first divisional manifold 8f, includes the second intake runners 7r connected to the second inlet ports 6r provided for the respective cylinders defined in the rearward bank Br, and the second convergent portion 9r to which the upstream of the second intake runners 7r are connected as shown in FIG. 4. The second intake runners 7r and the second convergent portion 9r are integrally connected to each other. To the second convergent portion 9r is integrally connected the second common intake passage 10r disposed upstream thereof. The second common intake passage 10r is further connected to the junction portion 11, to which the first common intake passage 10f for the forward bank Bf is also integrally connected. The mounting flange 7ra is formed at the downstream ends of the second intake runners 7r. The second mounting flange 7ra is adapted for connecting the second intake runners 7r to the respective second inlet ports 6b. In the second mounting flange 7ra are defined mounting screw holes 7rb through which screws are attached. The second common intake passage 10r has a coupling portion 94 formed at the downstream end thereof. The coupling portion 94 is formed correspondingly to the coupling portion 91 formed in the first convergent portion 9f so as to be coupled to the coupling portion 91 in an appropriate manner. The first and the second divisional manifolds 8f, 8r are connected to each other by coupling the coupling portions 91, 94 with each other. The second convergent portion 9r is further provided with a second communicating passage coupling portion 93. In the coupling portion 93 is defined an opening in communication with a center portion of the second convergent portion 9r and facing upward. Further, the second intake runners 7r are formed so as not to extend from the second inlet ports 6r to the second convergent portion 9r over plugholes 13. In other words, the second intake runners 7r extend over regions between the plugholes 13. With reference to FIG. 2, the second intake runners 7r connected respectively to the first and the third cylinders 51, 53 pass over the region between the plugholes 13 provided for the respective cylinders 51, 53. The second intake runner 7r connected to the fifth cylinder 55 passes over the region between the plugholes 13 provided for the third and the fifth cylinders 53, 55. In this way, the respective second intake runners 7r are connected to the second convergent portion 9r.

Figure 5:
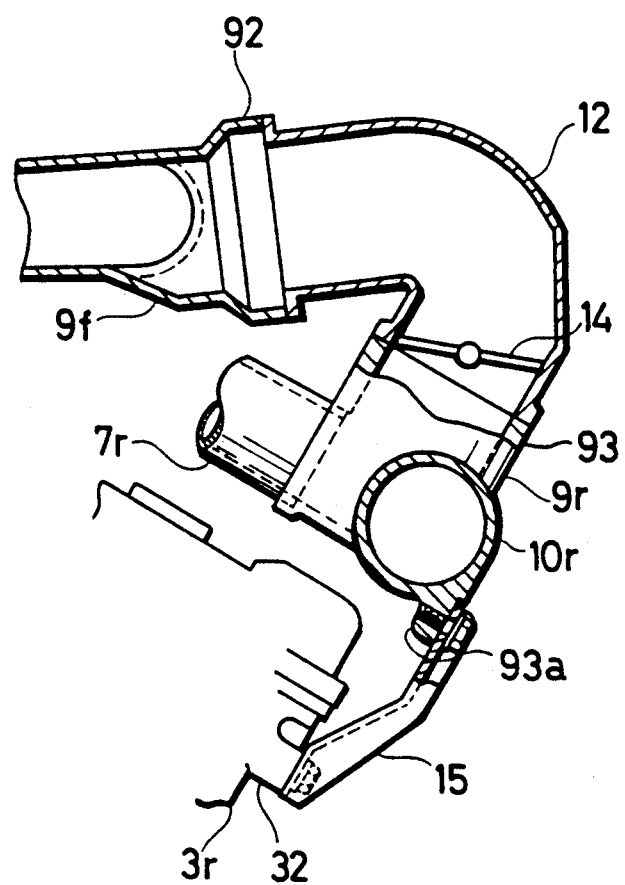
FIG. 5 is an enlarged sectional view showing a communicating passage and its relating elements.
Figure 6:
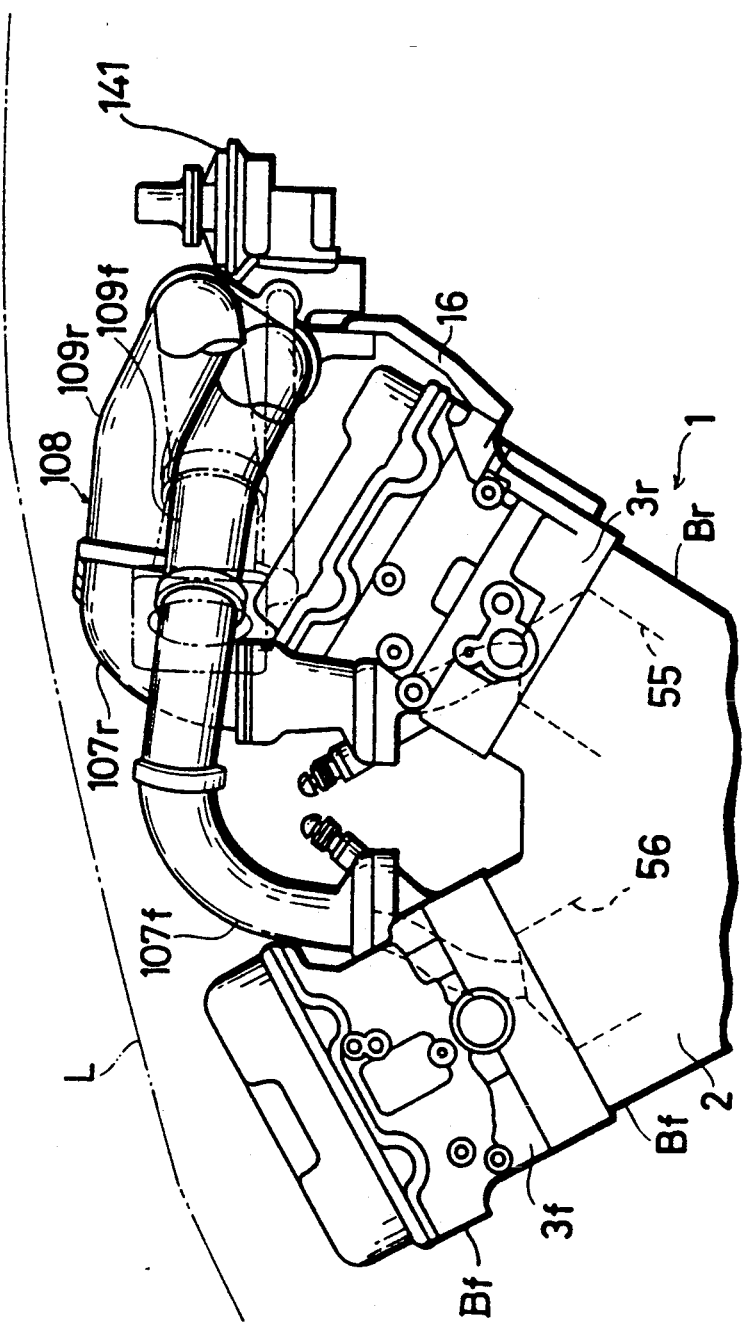
FIG. 6 is a side view showing an overall construction of an engine induction system incorporating the invention as a second embodiment.

Opposite ends of a communicating passage 12 in the form of L-shape are respectively connected to the communicating passage coupling portions 92, 93 formed in the convergent portions 9f, 9r. Thereby, the center portions of the convergent portions 9f, 9r are communicated with each other. As shown in FIG. 5, a valve 14 is disposed in the communicating passage 12 in the vicinity of communicating passage coupling portion 93. The valve 14 is adapted for opening and closing the communicating passage 12, and actuated by an unillustrated negative-pressure-actuator coupled to a shaft of the valve 14 through a rod. More specifically, the valve 14 is actuated to be in a closed state in a low or a medium engine speed regions while being actuated to be in an open state in a high engine speed region.

The common intake passages 10f, 10r are formed with extending from the respective convergent portions 9f, 9r in the cylinder arranging direction to the right at the back of the rearward cylinder row, and then curved obliquely forward toward a space defined between the forward and the rearward banks with respect to the lengthwise direction of the vehicle body. The upstream ends of the common intake passages 10f, 10r are connected to the junction portion 11 respectively, whereby the common intake passages 10f, 10r are connected to each other. The junction portion 11 has a support member 11a formed at a bottom portion thereof. The support member 11a is fixed to a mounting boss 31 provided at a lateral end portion of the upper surface of the rearward cylinder head 3r. The second convergent portion 9r has a support boss 93a formed at a lower portion thereof in the vicinity of the communicating passage coupling portion 93 with extending downward. The support boss 93a is fixed to a mounting boss 32 formed on a rearward side surface of the rearward cylinder head 3r through a bracket 15 as shown in FIG. 5.

As described above, in this embodiment, two groups of the intake runners 7f, 7r whose downstream ends are connected to the respective inlet ports 6 provided for the cylinders 51 to 56 defined in the banks Bf, Br are convergedly connected to the respective convergent portions 9f, 9r, which are both arranged above the rearward bank Br. Accordingly, a dead space between the upper surface of the rearward bank Br and the bonnet can be effectively utilized. The intake manifold is arranged on the upper portion of the engine main body along the bonnet line L of the vehicle body. In this way, the height of the engine can be reduced while assuring the intake runners 7f, 7r to have sufficient length. Consequently, the engine can be constructed smaller with respect to the height thereof.

Further, center portions of the convergent portions 9f, 9r are positioned over the region between the third and the fifth cylinders 53, 55, which is substantially a center of the rearward bank Br with respect to the cylinder arranging direction thereof with the center portion of the first convergent portion 9f located above that of the second convergent portion 9r. Accordingly, the intake manifold 8 is not to project from the engine main body 1 in the crank shaft extension direction, i.e., the cylinder arranging direction of the banks. In addition, since the convergent portions 9f, 9r are proximate to each other, the common intake passages 10f, 10r located upstream thereof do not take up much space unnecessarily. Accordingly, the engine can be constructed smaller with respect to the cylinder arranging direction as well. In this case, the intake runners 7f, 7r, the convergent portions 9f, 9r detour the region above the plugholes 13 provided for the respective cylinders defined in the rearward bank Br. This assures easy insertion of plugs into these plugholes 13.

Further, the common intake passages 10f, 10r are formed with extending from the respective convergent portions 9f, 9r in the cylinder arranging direction to the right at the back of the rearward cylinder row, and then curved obliquely forward toward the space between the forward and the rearward banks with respect to the lengthwise direction of the vehicle body. Accordingly, the length of the intake manifold 8 can be reduced with respect to a widthwise direction, i.e., a direction perpendicular to the cylinder arranging direction, of the engine as well.

Moreover, the second convergent portion 9r corresponding to the rearward bank Br is supported by the rearward cylinder head 3r through the bracket 15 by fixing the support boss 93a to the mounting boss 32 formed on the rearward cylinder head 3r. Accordingly, a portion of the second divisional manifold 8r away from the portion thereof mounted to the engine main body 1 can be effectively supported, and thereby the first divisional manifold 8f corresponding to the forward bank Bf can be also supported through the communicating passage 12. Furthermore, the junction portion 11 is supported by the rearward cylinder head 3r by way of the support member 11a formed at the lower portion of the junction portion 11. Accordingly, in the case where a heavy part, such as a throttle body, is connected to the upstream end of the junction portion 11 or an intake passage immediately upstream thereof, the heavy part can be supported without the use of other supporting member.

Moreover, the intake manifold 8 including the passage structure from the intake runners 7f, 7r at the downstream end up to the upstream junction portions 11 are formed separately into the first and the second divisional manifolds 8f, 8r respectively connected to the banks Bf, Br. Accordingly, the divisional manifolds 8f, 8r can be mounted to the engine main body 1 individually respectively. In addition, the respective divisional manifolds 8f, 8r can be formed substantially lighter compared to the integrally formed intake manifold, thereby facilitating the assembling of the intake manifold 8 to the engine main body 1. Further, the divisional manifolds 8f, 8r are arranged vertically in the plane of the drawing of FIG. 2 with the first divisional manifold 8f positioned above the second divisional manifold 8r. Accordingly, the manifold 8 can be easily mounted to the engine main body by mounting the lower second divisional manifold 8r to the engine main body 1 at first, and then mounting the upper first divisional manifold 8f. Furthermore, the diameter of the mounting screw holes 7fb is greater than that of mounting screw holes 7rb defined in the second mounting flange 7ra of the second divisional manifold 8r. When the coupling portions 91, 94 of the divisional manifolds 8f, 8r are coupled to each other, there are some cases where the coupling surfaces thereof are not in perfect engagement with each other due to a mounting error or other causes. Such dislocation of the coupling surfaces of the coupling portions 91, 94 can be compensated for by the larger defined screw holes 7fb of the first divisional manifold 8f mounted to the engine main body 1 after the second divisional manifold 8r. Besides, the coupling surface of the coupling portion 91 faces obliquely with respect to the cylinder arranging direction. Therefore, the coupling surfaces are not dislocated unidirectionally, i.e., in the cylinder arranging direction or the widthwise direction of the engine. As a result, the dislocation of the coupling surfaces can be easily compensated for by the screw holes 7fb. This further facilitates the coupling of the coupling portions 91, 94.

The communicating passage 12 is formed into a L-shape, which facilitates connection of respective ends of the communicating passage 12 to the communicating passage connection portions 92, 93 of the convergent portions 9f, 9r, assuring an easier connection of the convergent portions 9f, 9r. Further, the L-shaped communicating passage 12 has a linear portion for accommodating the valve 14 therein, and connects the respective convergent portions 9f, 9r with a shortest possible passage without making a cross-section thereof smaller. Accordingly, in the case where the plenum of the communicating passage 12 is used as a resonance space, an engine speed region in which the maximum resonance effect can be obtained shifts to a higher level. In this case, the offset amount of the convergent portions 9f, 9r is set smaller than that of the forward and the rearward cylinder rows, so that the convergent portions 9f, 9r can be disposed with the center portions thereof positioned above the region between the third and the fifth cylinders 53, 55 of the rearward bank Br. Accordingly, the distance between the convergent portions 9f, 9r can be made shortest regardless of the fact that the forward and the rearward cylinder rows in the respective banks Bf, Br are offset to each other because of being provided in the V-shaped engine. Therefore, the length of the communicating passage 12 can be effectively shortened. Consequently, the divisional manifolds 8f, 8r can be connected to each other through the communicating passage 12 more rigidly.

In the low or the medium engine speed region, since the valve 14 is actuated to be in the closed state, the plenum of the passage structure from the intake runners 7f, 7r to the common intake passages 10f, 10r serves as a resonance space with using the junction portion 11 as a pressure inverting portion. Accordingly, the intake air can be supercharged into the respective cylinders due to the resonance effect. Also, in the high engine speed region, since the valve 14 is actuated to open the commuication passage 12, the plenum of the passage structure from the intake runners 7f, 7r to the communicating passage 12 serves as a resonance space with using the openings defined in the coupling portions 92, 93 for connecting the respective convergent portions 9f, 9r through the communicating passage 12 as pressure inverting portions respectively. Accordingly, the intake air can be supercharged into the respective cylinders due to the resonance effect. Further, the intake can also be supercharged into the respective cylinders due to the inertia effect obtained by using the openings of the connection portions 92, 93 as pressure inverting portions. In addition, the respective intake runners 7f, 7r are formed so as to have the lengths equal to one another, and connected to the corresponding convergent portions 9f, 9r. Accordingly, distributivity of the intake air to the respective cylinders can be improved, and dynamic effects can be obtained uniformly between the respective cylinders. As will be seen from the above, the dynamic effects of induction can be effective utilized in a wide range of engine speed.

Next, a second embodiment of the invention will be described with reference to FIGS. 6 to 11.

Similarly to the first embodiment, in this embodiment, reference numeral 1 designates an engine main body of a V-shaped six-cylinder engine transversely accommodated in an engine compartment located under a bonnet in a forward section of a vehicle. A forward bank Bf is provided with three cylinders, namely, cylinders 52, 54, 56. A rearward bank Br is provided with three cylinders, namely, cylinders 51, 53, 55. In the second embodiment as well, subscripts f and r used in reference numerals denotes elements in connection with the forward bank Bf and the rearward bank Br respectively. The cylinders provided in the forward bank Bf and those provided in the rearward bank Br are arranged with offsetting to each other in a direction of extension of a crank shaft.

Indicated at 108 is an intake manifold. The intake manifold 108 comprises two groups of intake runners extending individually from the respective cylinders, first intake runners 107f and second intake runners 107r. Upstream ends of the respective first intake runners 107f are convergedly connected to a first convergent portion 109f. Similarly, upstream ends of the respective second intake runners 107r are convergedly connected to a second convergent portion 109r.

Neither of the convergent portions 109f, 109r has such a large volume as a surge tank. The intake runners 107f, 107r are convergedly connected to the convergent portions 109f, 109r respectively. The convergent portions 109f, 109r are formed with gradually tapered to upstream ends thereof, so that the upstream ends thereof are directly connected to a first and a second common intake passages 131, 132 corresponding respectively to the forward bank Bf and the rearward bank Br. The convergent portions 109f, 109r are both disposed above the rearward bank Br.

Thus far, this embodiment is constructed similarly to the first embodiment. However, this embodiment differs from the first embodiment in the following arrangement. The convergent portions 109f, 109r are vertically disposed to each other to the plane of the drawing in FIG. 7 with the first convergent portion 109f positioned below the second convergent portion 109r. More specifically, the first intake runners 107f corresponding to the forward bank Bf extend rearward from the forward bank Bf, and connected to the first convergent portion 109f above the rearward bank Br. The intake runners 107f, 107r are alternately arranged with interposing the runner of one group between the two adjacent runners of the other. Accordingly, the second intake runners 107r extend upward from the rearward bank Br with intersecting with the first intake runners 107f, curved rearward above the first intake runners 107f, and connected to the second convergent portion 109r.

The convergent portions 109f, 109r to which the intake runners are connected are arranged above the rearward bank Br inwardly of plugholes 13 for ignition plugs provided in the rearward bank Br. Upstream end portions of the convergent portions 109f, 109r, i.e., portions connected to the common intake passages 131, 132 to be described below, extend the regions between the two adjacent plugholes 13, and curved to the right in the cylinder arranging direction in such positions outward of the plugholes 13 respectively.

Figure 8:
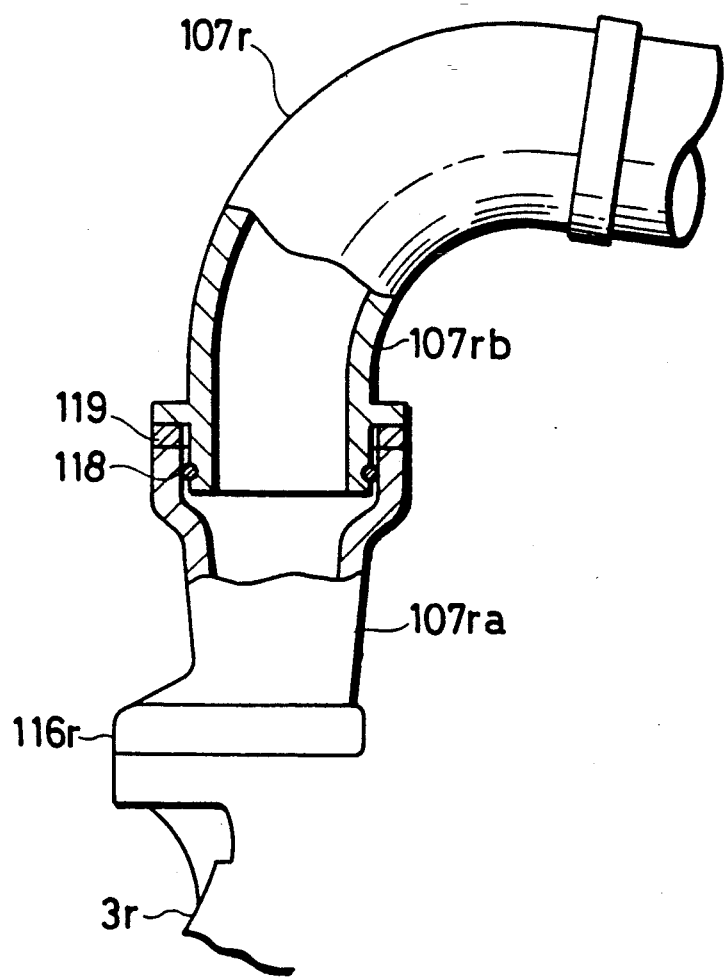
FIG. 8 is an enlarged side view partially in section showing an intake runner extending from a forward bank of the second engine induction system.
Figure 9:
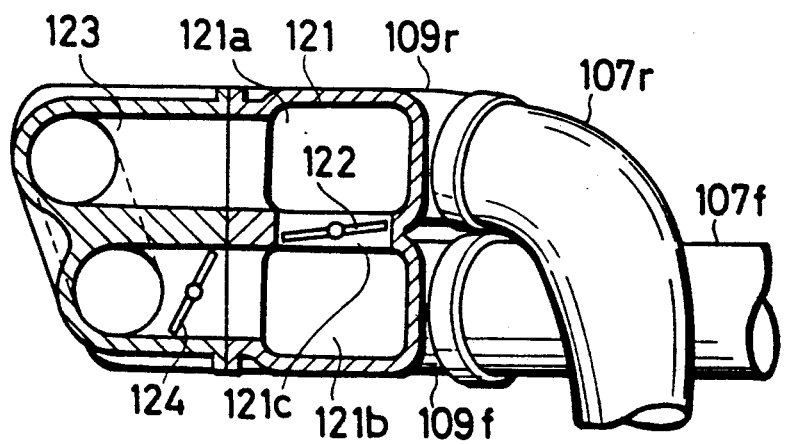
FIG. 9 is an enlarged section view showing a portion of the second engine induction system to which communication passages are connected.

The intake manifold 108 is assembled to the engine main body 1 by mounting the upstream portions of the convergent portions 109f, 109r to the engine main body 1 through a stay 115 and bolting a first and a second mounting flanges 116f, 116r disposed respectively at downstream end portions of the first and second intake runners 107f, 107r to the respective banks. In order to facilitate the assembling operation, particularly, each of the second intake runners 107r is so constructed that a downstream portion 107ra and an upstream portion 107rb thereof are fittably connected to each other. In other words, as shown in FIG. 8, the second intake runner 107r comprises the downstream portion 107ra having the flange 116r and the upstream portion 107rb, which are separately formed. The downstream end of the downstream portion 107ra is connected to a rearward cylinder head 3r, and the downstream end of the upstream portion 107rb is fittably connected to the upstream end of the downstream portion 107ra. An O-ring 118 is provided between an inner circumferential surface of the downstream portion 107ra and an outer circumferential surface of the upstream portion 107rb where the upstream portion 107rb is fitted to the downstream portion 107ra. Further, a vibration isolating rubber 119 is provided between an upstream end face of the downstream portion 107ra and an opposing surface of a flange portion provided at the downstream end of the upstream portion 107rb.

At the upstream portion of the intake manifold 108 is provided an intake passage portion 130 to be described below. The intake manifold 108 is further provided with first and second communication changing means in order to change the effective length of the intake passage to obtain appropriate resonance effect.

The first communication changing means includes a communicating passage 121 and a valve 122 for opening and closing the communicating passage 121. The second communication changing means includes another communicating passage 123 bypassing the valve 122 and another valve 124 provided in the communicating passage 123.

Specifically, the communicating passage 121 is formed with projecting in a cylinder arranging direction from the convergent portions 109f, 109r respectively, and has an upper passage portion 121a lower passage portion 121b, and a communicating hole 121c in which the valve 122 is disposed to put the passage portions 121a, 121b into or out of communication. The passage portions 121a, 121b, and the communicating hole 121c provide the communicating passage 121 for a high engine speed region.

Furthermore, another communicating passage 123 is provided with opposite ends thereof connected to the upper and the lower passage portions 121a, 121b. Opposite end portions of the communicating passage 123 extend rearward from the upper and lower passage portions 121a, 121b into a center portion thereof curved to the right and formed into U-shape. The valve 124 is provided in the communicating passage 123 for opening and closing it.

The valves 122, 124 are respectively actuated by actuators 125, 126. The actuators 125, 126 are operated according to loads by means of, for example, an unillustrated electromagnetic valve or the like. In accordance with control signals sent to the electromagnetic valve or the like corresponding to loads, the actuators 125, 126 respectively actuate the valve 122, 124 as follows.

The valves 122, 124 are actuated to be in their respective closed states in a low engine speed region. The valve 122 is actuated to be in its closed state while the valve 124 being actuated to be in its open state in the medium engine speed region. The valves 122, 124 are actuated to be in their respective open states in a high engine speed region.

The intake passage portion 130 is provided integrally with the common intake passages 131, 132 respectively corresponding to the forward bank Bf and the rearward bank Br and communicating with the convergent portions 109f, 109r. A downstream end of the intake passage portion 130 is connected to the upstream ends of the respective convergent portions 109f, 109r at a rear portion of the engine main body 1, and then the intake passage portion 130 is curved in the cylinder arranging direction to the right. An upstream portion of the intake passage portion 130 is curved at one lateral end of the rearward bank Br, and extends forward. The common intake passages 131, 132 of the intake passage portion 130 are formed in parallel to each other in such a twisted manner as to be disposed vertically in correspondence to the vertically disposed convergent portions 109f, 109r on the downstream sides, but disposed the more horizontally the more they extend to the upstream end.

To the upstream end of the intake passage 130 is connected a junction portion 133 in communication with the common intake passages 131, 132. Further, a throttle body 134 accommodating a throttle valve 135 is connected to the junction portion 133. The junction portion 133 and the throttle body 134 are positioned near a space defined between the forward and the rearward banks Bf, Br, and are coupled to an engine hanger 136. The throttle valve 135 is pivotable about a horizontal axis thereof and adapted to pivot in accordance with movement of an accelerator. In the junction portion 133, there are defined various inlets for introducing the air and the gas into the intake passage portion 130. An air inlet 137 for introducing the air is an opening in communication with an idle speed control (ISC) pipe bypassing the throttle valve 135 or other pipes. A purged fuel inlet 138 is adapted for introducing purged fuel to the intake passage portion 130. An exhaust gas recirculation (EGR) inlet 139 is adapted for introducing recirculated exhaust gas to the intake passage portion 130. A blowby gas inlet 140 is adapted for introducing blowby gas to the intake passage portion 130. Indicated at 141 is an EGR valve, and at 142 an EGR pipe. To an upstream end of the throttle body 134 are connected unillustrated upstream intake passage, air cleaner, etc.

With thus constructed induction system of this embodiment, when the valves 122, 124 are in their respective closed states, pressure waves are imparted from the cylinders all the way through the intake runners 107f, 107r extending from the respective banks Bf, Br, the convergent portions 109f, 109r, and the common intake passages 131, 132 to the junction portion 133. Accordingly, a resonance supercharging effect can be obtained in the low engine speed region. More specifically, an intake stroke in one cylinder is not continuously followed by an intake stroke in another cylinder in one bank of V-shaped engine. The same thing can be said for intake strokes in the cylinders in the other bank. The pressure waves generated in the respective cylinders in the rearward bank Br are imparted through the second intake runners 107r, second convergent portion 109r, and second common intake passage 132 to the junction portion 133. Similarly, the pressure waves generated in the respective cylinders in the forward bank Bf are imparted through the first intake runners 107f, first convergent portion 109f, and first common intake passage 131 to the junction portion 133. In this way, the pressure waves are imparted from the cylinders a sufficiently long distance to the junction portion 133, and thereby the resonant supercharging effect can be obtained in the low engine speed region.

Further, when the valve 124 is in its open state, the convergent portions 109f, 109r communicate with each other through the passage portions 121a, 121b, and the communicating passage 123. Accordingly, an imparting path of the pressure waves is shortened to the passage portions 121a, 121b, and the communicating passage 123, shortening the effective length of the passage for imparting the pressure waves. Thus, the resonant supercharging effect can be obtained in the medium engine speed region.

Moreover, when the valve 122 is in its open state, the convergent portions 109f, 109r are connected to each other through the passage portion 121. Accordingly, the effective length of the passage is further shortened, and thus the resonant supercharging effect can be obtained in the high engine speed region.

In order to obtain dynamic effects in charging the intake air into the cylinders, the first and the second intake runners 107f, 107r corresponding to the forward and rearward banks Bf, Br are connected to the two different convergent portions. By arranging the convergent portions 109f, 109r vertically above the rearward bank Br, the layout of the intake runners 107f, 107r and the convergent portions 109f, 109r can be made compact.

In addition, by positioning the second convergent portion 109r above the first convergent portion 109f over the rearward bank Br, the intake runners 107f, 107r extending respectively from the banks Bf, Br to the convergent portions 109f, 109r are formed with curved not sharply but smoothly. This allows the intake air to flow smoothly in the intake runners 107f, 107r. Further, the difference in length between the intake runners 107f and the intake runners 107r can be made sufficiently small. Particularly, the convergent portions 109f, 109r are constructed compact, both not including surge tanks. Accordingly, the length difference between the passages provided for one bank can also be made sufficiently small. Therefore, the resonance supercharging effect can be exhibited substantially uniformly between the respective cylinders in the same bank.

Further, the communicating passages 121, 123, etc constituting the first communication changing means and the second communication changing means are also so arranged over the rearward bank Br as not to take up much space. The respective convergent portions 109f, 109r are connected to the communicating passage 121 serving as first communication changing means, to which the communication passage 123 serving as second communication changing means is connected. This serves to reduce the flow resistance.

Figure 10:
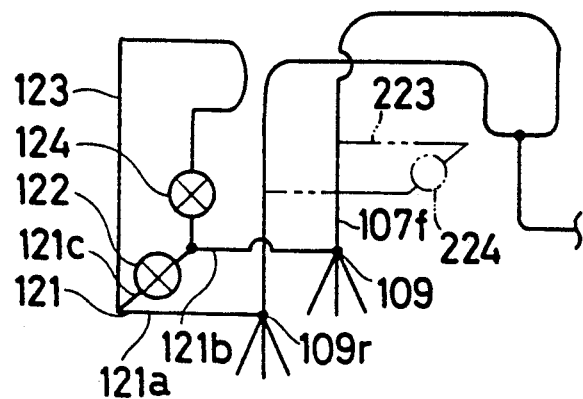
FIG. 10 is a schematic diagram showing a passage structure of the second engine induction system.
Figure 11:
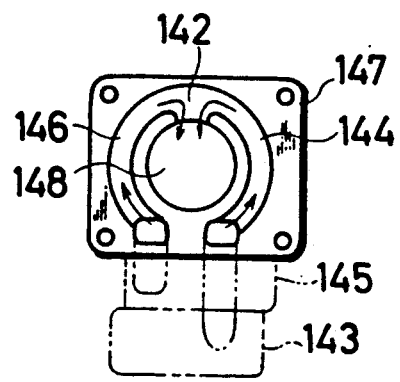
FIG. 11 is a diagram showing a portion of a junction portion in which an air inlet and other inlets are defined.

More specifically, there has been conventionally known an induction system in which another communication passage 223 serving as second communication changing means shown in phantom line in FIG. 10 is connected to the intake passage independently of the communication passage 121 serving as first communication changing means as the one provided with a plurality of communication changing means. In this system, when the valves 122, 224 for opening or closing the communicating passages 121, 223 respectively are in their closed states, the communicating passages 121, 223 are respectively open to the intake passage in different positions with serving as dead volume, where swirls have been known to occur. These swirls causes the intake air to flow turbulently. Consequently, the resistance in the intake air flow increases and the intake air suffers from an increasing pressure drop due to the dead volume, i.e., unutilized space in the intake passage caused by the increased resistance.

On the contrary, in this embodiment, it is only the passage portions 121a, 121b of the communicating passage 121 which are open to the intake passages as dead volume when the valves 122, 124 are in their closed states. Accordingly, the resistance in the intake air flow and pressure loss caused by such swirls can be reduced.

Further, the passage portions 121a, 121b of the communicating passage 121 of the first communication changing means are connected to the convergent portions 109f, 109r in such a manner as to communicate with the center portions of the convergent portions 109f, 109r. Accordingly, the passage length from the intake runner to the communicating passage can be sufficiently reduced when the pressure waves are imparted through the communicating passage constituted by the passage portions 121a, 121b, and the passage 123 in the medium engine speed region, and by the passage portions 121a, 121b in the high engine speed region. Therefore, the resonance effect can be exhibited uniformly between the respective cylinders.

When the intake runners 107r, 107f are connected to the respective convergent portions 109r, 109f above the rearward bank Br as described above, a projected amount of the induction system rearward of the rearward bank Br can be made smaller if the convergent portions 109r, 109f are arranged inward of the plugholes 113. This is effective in constructing a smaller engine, and advantageous in terms of safety against collision.

With the intake runners 107f, 107r and the convergent portions 109f, 109r arranged as described above, the first intake runners 107f extend right above the flange portion provided at the downstream end of the second intake runners 107r. In this state, such operations are very difficult to connect the downstream ends of the second intake runners 107r to the rearward cylinder head 3r by the bolts. However, in this embodiment, the second intake runners 107r are divided into the downstream portions 107ra and the upstream portions 107rb in advance, and the downstream portions 107ra and the upstream portions 107rb are respectively constructed to be fittably connected to each other. Accordingly, an assembling operation of the intake manifold 108 to the engine main body carried out easily. More specifically, in this assembling operation, only the downstream portions 107ra of the second intake runner 107r are connected to the rearward cylinder head 3r at first. Therefore, the second intake runners 107r can be bolted to the rearward cylinder head 3 without being interfered by the first intake runners 107f. The upstream portions 107rb are thereafter fittably connected to the downstream portions 107ra, and the downstream ends of the first intake runners 107f are bolted to the forward cylinder head 3f. Further, the intake manifold 108, the intake passage portion 130 and other parts are secured to the stay 116 and the engine hanger 136 at specified positions thereof. In this way, the entire intake manifold 108 can be assembled to the engine main body 1. Moreover, the vibration isolating rubber 119 is provided between the downstream portions 107ra and the upstream portions 107rb of the second intake runners 107r. This obviates the likelihood that the vibrations are imparted to the two portions 107ra, 107rb, and assures that the downstream and the upstream portions 107ra, 107rb are reliably fitted to each other.

The common intake passages 131, 132 connected to respective upstream ends of the convergent portions 109f, 109b are formed in parallel to each other in such a twisted manner as to be disposed vertically in correspondence to the vertically disposed convergent portions 109f, 109r on the downstream sides, but disposed the more horizontally the more they extend to the upstream end. Accordingly, even in the case where the throttle valve 135 is disposed upstream of the common intake passages 131, 132, the intake air can be distributed into the common intake passages 131, 132 satisfactorily uniformly.

Figure 7:
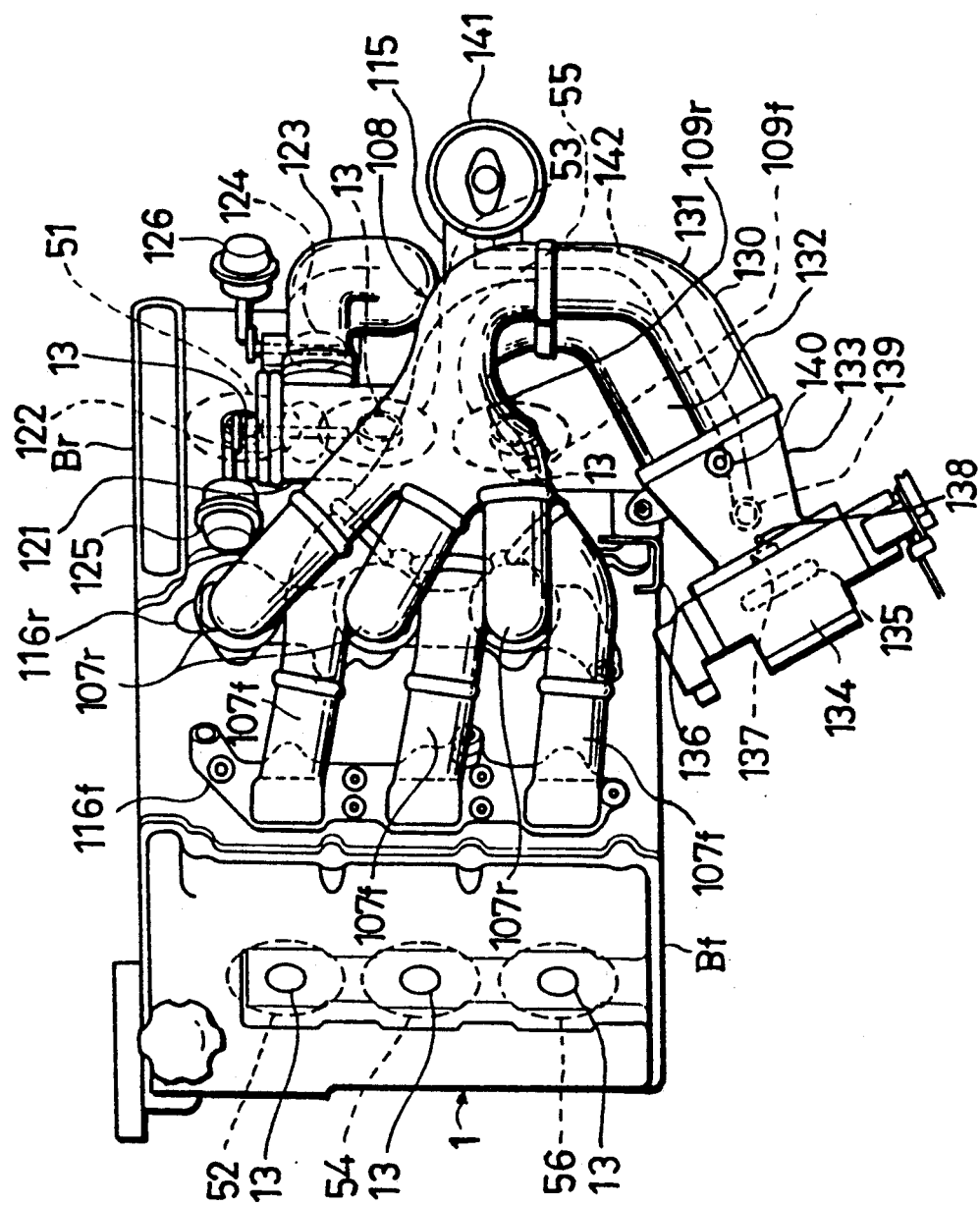
FIG. 7 is a plan view showing an overall construction of the second engine induction system.

More specifically, the single throttle valve 135 is disposed upstream of the junction portion 133 as shown in FIG. 7 in order to have a more simplified construction than a case where two throttle valves are disposed individually for the respective common intake passages 131, 132. Further, the throttle valve 135 is made pivotable about a horizontal axis thereof. With the throttle valve 135 thus disposed, if the common intake passages 131, 132 are arranged vertically at the upstream portions thereof similarly to the downstream portions thereof, the intake air is liable to flow into the upper and the lower common intake passages nonuniformly.

On the contrary, if the common intake passages 131, 132 are arranged horizontally in parallel to each other at the upstream portions thereof as in this embodiment, the intake air passing the throttle valve 135 can be distributed into the respective common intake passages 131, 132 uniformly.

Further, since the intake passage portion 130 including the common intake passages 131, 132 corresponding to the respective banks Bf, Br extends in the cylinder arranging direction to the right along the rear end of the rearward bank Br, and is curved at one lateral end of the rearward bank Br to extend toward the vicinity of the space defined by the respective banks Bf, Br. This assures the common intake passages 131, 132 to have length sufficient to exhibit the resonance effect in the low engine speed region. Moreover, the intake passage portion 130 are curved along the contour of the rearward bank Br, and the junction portion 133 and the throttle body 134 can be disposed near the space between the banks Bf, Br. Thereby, the intake passage portion 130 can be arranged with the upstream end thereof sufficiently approaching the engine main body 1 while avoiding interference with the side wall of the rearward bank Br. For example, the junction portion 133 and the throttle body 134 may be disposed near the space between the banks Bf, Br to an extent that they are disposed in that space. Accordingly, the layout of the intake passage portion 130 can be made compact.

Also, it is desirable to arrange the various inlets 137 to 140 defined in the junction portion 133 for introducing the air and the gas into the intake passage portion 130 on a linear line in a direction of extension of a wall partitioning the common intake passages 131, 132, so that the air and the gas can be supplied to these passages 131, 132 substantially uniformly.

Particularly, it is advantageous to provide the air inlet 137 more upstream than the other inlets so as to improve the distributivity of the air into the common intake passages 131, 132. It is advantageous, on the other hand, to provide the blowby gas inlet 140 and the EGR inlet 139 away from the throttle valve 135 in order to prevent carbon and oil mists from depositing on the throttle valve 135. The recirculated exhaust gas is required to distribute more uniformly than the blowby gas. In consideration of the foregoing, it is desirable to arrange the air inlet 139, the purged fuel inlet 138, EGR inlet 139, and blowby gas inlet 140 in this order from the most upstream side.

To the air inlet 137 are connected the ISC pipe 144 through which the air regulated by an ISC valve 143 flows in an idle operating condition, and an air pipe 146 through which the air flows by way of an air valve 145 when external loads are applied. Both the ISC valve 143 and the air valve 146 are disposed at a lower portion of the throttle body 134.

In the case where the air inlet 137 and other inlets are provided in this manner, the following problem is liable to occur. If the inlets are defined at a lower side of the intake passage, oil and water deposited in the intake passage downstream of the throttle valve 135 enter the ISC pipe 143 and the air pipe 143 through those inlets. This may cause the valves 143, 145 to be inoperable.

Accordingly, in this embodiment, the air inlet 137 is defined at an upper portion of the junction portion 133 so as to prevent the water or the like from entering the ISC pipe 143 and the air pipe 145. Further, it is desirable to form conduits 144, 146 extending from the bottom to the air inlet 142 in opposite directions around a hole 148 partially defining a cross-section of the intake passage in a flange 147 for connecting the junction portion 133 and the throttle body 134.

As described above, in an engine induction system of the invention, intake runners extending individually from cylinders in each of a plurality of cylinder rows are connected to a convergent portion having a small volume, and each convergent portion is arranged above one of the cylinder rows. Accordingly, an intake manifold can be assembled to an engine main body with assuredly enabling the respective intake runners to have sufficient lengths while suppressing the height of the engine substantially.

Further, common intake passages upstream of the respective convergent portions are proximate to each other, the intake passage portion do not take up much space. Consequently, the intake manifold can be made smaller, thereby making the size of the engine smaller.

Furthermore, communicating passages are provided for communicating center portions of the convergent portions with each other, and valves are also provided for opening or closing the respective communicating passages according to an engine speed. Accordingly, the intake air can be supercharged into the cylinders due to the dynamic effects of induction in a wide range of engine speed.

Moreover, since the intake runners having the same length are connected to the compact convergent portion, distributivity of the intake air into the respective cylinders can be improved. In addition, the respective cylinders are uniformly subject to the dynamic effects of induction, and therefore further improved dynamic effects of induction can be obtained in the engine as a whole.

Particularly, in the case where the invention is embodied into a V-shaped engine transversely placed in an engine compartment relative to a vehicle body, convergent portions connected through intake runners to cylinders provided in respective forward and rearward banks are arranged vertically above the rearward bank with the convergent portion corresponding to the forward bank positioned above the one corresponding to the rearward bank. In this way, the dead space in the engine compartment between the rearward bank and a bonnet can be effectively utilized, which assuredly enables the respective intake runners to have sufficient lengths while suppressing the height of the engine substantially along a contour line of the bonnet.

Further, an induction system for use in a V-shaped engine is provided with a junction portion to which common intake passages extending from respective convergent portions are connected in addition to the convergent portions. Also, the intake manifolds including a passage structure from intake runners to the junction portion comprises a first divisional manifold connected to the forward bank and a second divisional manifold connected to the rearward bank. The first and the second divisional manifolds are formed separately and arranged vertically with the first divisional manifold positioned above the second divisional manifold. This arrangement enables the respective intake runners to have sufficient lengths while suppressing the height of the engine substantially, thereby contributing to constructing a smaller engine. In addition, the respective divisional manifolds can be formed more lightweighted, and can be assembled to the engine main body individually. As a consequence, the intake manifold can be assembled to the engine main body more easily and readily.

The invention can be also embodied in a V-shaped engine in the following manner. Intake runners extending from the forward and the rearward banks of the V-shaped engine are respectively connected to a first and a second compact convergent portions. The respective convergent portions are vertically arranged above the rearward bank with the second convergent portion positioned above the first convergent portion. Thus, the induction system is made smaller while assuring the passage length enough for obtaining the resonance effect.

In addition, the passages extending from the cylinders provided in the respective banks are rendered to have the substantially same length, thereby being uniformly subjected to the resonance effect. Consequently, the resonance effect can be maximally utilized in the induction system.

Further, the invention can be embodied in a V-shaped engine in the following manner. Respective convergent portions corresponding to a forward and a rearward banks are arranged above the rearward bank, and an intake passage portion comprising common intake passages corresponding to the respective banks upstream of the convergent portions is arranged as follows. The downstream portion of the intake passage portion extends in a cylinder arranging direction along the rear end of the rearward bank, and curves at one lateral end of the rearward bank in such a direction as to extend toward the space between the banks. An upstream end portion of the intake passage portion and a throttle body connected thereto are arranged near the space between the banks. Accordingly, the common intake passages are assured to have the length sufficient to obtain the efficient resonance effect. Moreover, the intake manifold including the convergent portions, the common intake passages, and the throttle body can be laid out near the banks in a compact manner. Consequently, the induction system can be easily accommodated in the engine compartment.

Furthermore, first and second communication changing means are provided for changing communication of the convergent portions corresponding to the respective banks. The first communication changing means comprises a communicating passage for communicating the respective convergent portions, and a valve disposed in the communicating passage for opening or closing it. The second communication changing means comprises another communicating passage connected to the communicating passage of the first communication changing means bypassing the valve thereof, and a valve disposed in the another communicating passage for opening or closing it. Accordingly, the effective passage length is variable in steps and the resonance effect can be obtained in various engine speed regions. In addition, the above constructed first and the second communication changing means are capable of reducing the pressure loss and resistance in the intake air flow. Therefore, the charging efficiency can be effectively improved and the engine output can be enhanced.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be constructed as being included therein.

What is claimed is:

1. An induction system for use in an engine including a plurality of rows of cylinders, the induction system comprising;
   intake runners individually extending from the respective cylinders;
   convergent portions respectively provided for the plurality of cylinder rows, the convergent portion being adapted for connecting the intake runners connected to the respective cylinders of each row in a substantially convergent form with the same distance being held between a center of the convergent portion and the cylinders to which the intake runners are respectively connected, and convergent portions being arranged above one of the plurality of cylinder rows;
   common intake passages respectively connected to the convergent portions corresponding to the plurality of cylinder rows;
   a junction portion for connecting the common intake passages;
   a communicating passage for communicating the convergent portions with each other; and
   a valve provided in the communicating passage for opening or closing the communicating passage according to an engine speed.

2. An induction system as defined in claim 1 wherein the engine is a V-shaped engine including two banks each having a row of cylinders and mounted in a vehicle body with a crank shaft thereof extending in a widthwise direction of the vehicle body and the first bank positioned forward relative to the second bank, the convergent portions respectively corresponding to the cylinder rows of the first and second banks are vertically arranged above the second bank with the convergent portion corresponding to the cylinder row of the first bank positioned above the convergent portion corresponding to the cylinder row of the second bank, and the communicating passage for communicating the convergent portions is L-shaped.

3. An induction system as defined in claim 2 further comprising support means for supporting the portion of the convergent portion corresponding to the cylinder row of the second bank which is in the vicinity of the communicating passage and the junction portion to a main body of the engine.

4. An induction system as defined in claim 2 wherein the cylinders of the first bank and the cylinders of the second bank are offset to one another in a direction of the crank shaft, and the convergent portions are offset to each other at a smaller amount than the cylinders, and the communicating passage is formed with extending rearward from the convergent portion corresponding to the first bank, curving downward, and connected to the other convergent portion corresponding to the second bank.

5. An induction system for use in a V-shaped engine including a first bank provided with a row of cylinders and a second bank provided with a row of cylinders, the induction system comprising:
   a first manifold member;
   a second manifold member; and
   means for selectively communicating between the first and second manifold members;
   the first manifold member including
      intake runners individually extending from the respective cylinders provided in the first bank; and
      a first downstream connection portion for connecting respective upstream ends of the intake runners connected to the first bank;
      the intake runners and the first downstream connection portion being integrally formed; and
   the second manifold member including
      intake runners individually extending from the respective cylinders provided in the second bank;
      a second downstream connection portion for connecting the upstream ends of the intake runners connected to the second bank; and
      an upstream connection portion for connecting an upstream end of the first downstream connection portion and an upstream end of the second downstream connection portion;
      the intake runners of the second manifold member, the second downstream connection portion, and the upstream connection portion being integrally formed; and
   the first downstream connection portion being arranged above the second downstream connection portion, and both the first downstream connection portion and the second downstream connection portion being arranged above the second bank.

6. An induction system as defined in claim 5 wherein the first manifold member includes a hole for attaching the first manifold member to the engine, the second manifold member includes a hole for attaching the second manifold member to the engine, the diameter of the hole of the first manifold member is larger than that of the second manifold member.

7. An induction system for use in a V-shaped engine including a first bank provided with a row of cylinders and a second bank provided with a row of cylinders, the induction system comprising:
a first manifold member; and
a second manifold member separably coupled to the first manifold member;
the first manifold member including
  intake runners individually extending from the respective cylinders provided in the first bank; and
  a first downstream connection portion for connecting respective upstream ends of the intake runners connected to the first bank;
  the intake runners and the first downstream connection portion being integrally formed; and
the second manifold member including
  intake runners individually extending from the respective cylinders provided in the second bank;
  a second downstream connection portion for connecting the upstream ends of the intake runners connected to the second bank; and
  an upstream connection portion for connecting an upstream end of the first downstream connection portion and an upstream end of the second downstream connection portion;
  the uptake runners, the second downstream connection portion, and the upstream connection portion being integrally formed;
the first manifold member being arranged above the second manifold member, and first downstream connection portion, the second downstream connection portion, and the upstream connection portion being arranged above the second bank;
wherein the first downstream connection portion and the second dowstream connection portion are respectively shaped into such a convergent form as to connect their respective intake runners with the same distance being held between a center of the respective connection portions and the cylinders to which the intake runners are respectively connected; and further comprises:
a communicating passage for communicating the first and second downstream connection portions with each other so as to provide a resonance space;
a valve provided in the communicating passage for opening or closing the communicating passage according to an engine speed.

8. An induction system as defined in claim 7 further comprising:
a first common intake passage provided between the first downstream connection portion and the upstream connection portion for connecting them, the first common intake passage having a coupling surface for coupling the first manifold member and the second manifold member to each other, the coupling surface being inclined at an angle relative to a cylinder arranging direction when viewed from above;
a second common intake passage provided between the second downstream connection portion and the upstream connection portion for connecting them, the second common intake passage having a coupling surface for coupling the first manifold member and the second manifold member to each other, the coupling surface being inclined at the same angle as the coupling surface of the first common intake passage;
the first and second common intake passages being curved toward a space between the first and the second banks.

9. An induction system for use in a V-shaped engine including a first bank provided with a row of cylinders and a second bank provided with a row of cylinders, the induction system comprising:
intake runners individually extending from the respective cylinders provided in the first bank;
a first convergent portion for connecting the intake runners connected to the first bank in a convergent form;
a first common intake passage connected to the first convergent portion;
intake runners individually extending from the respective cylinders provided in the second bank;
a second convergent portion for connecting the intake runners connected to the second bank in a convergent form;
a second common intake passage connected to the second convergent portion;
a junction portion for connecting the first and second common intake passages;
the first and second convergent portions being arranged above the first bank with the second convergent portion underlying the first convergent portion.

10. An induction system as defined in claim 9 wherein the cylinders respectively have plugholes for ignition plugs, the intake runners extend from inner side walls of the first and second banks, and the first and second convergent portions are arranged inwardly of the plugholes provided in the first bank.

11. An induction system as defined in claim 9 wherein the respective intake runners extending from the first bank include downstream portions connectable to the first bank and upstream portions connectable to the first convergent portion, the downstream portions and the upstream portions being fittably connectable to each other.

12. An induction system as defined in claim 9 wherein the V-shaped engine is mounted in a vehicle body with a crank shaft thereof extending in a widthwise direction of the vehicle body and the first bank being positioned rearward relative to the second bank.

13. An induction system for use in a V-shaped engine including a first bank provided with a row of cylinders and a second bank with a row of cylinders, the induction system comprising:
intake runners individually extending from the respective cylinders provided in the first bank;
a first convergent portion for connecting the intake runners connected to the first bank in a convergent form;
a first common intake passage connected to the first convergent portion;
intake runners individually extending from the respective cylinders provided in the second bank;
a second convergent portion for connecting the intake runners connected to the second bank in a convergent form;
a second common intake passage connected to the second convergent portion;
a junction portion for connecting the first and second common intake passages:
the first and second convergent portions being arranged above the first bank with one underlying the other, wherein downstream ends of the first and second common intake passages are arranged with one underlying the other at the first and second convergent portions and wherein upstream ends of the first and second common intake passages are arranged side by side at the junction portion.

14. An induction system for use in a V-shaped engine including a first bank provided with a row of cylinders and a second bank provided with a row of cylinders, the induction system comprising:
  intake runners individually extending from the respective cylinders provided in the first bank;
  a first connection portion for connecting the intake runners connected to the first bank;
  a first common intake passage connected to the first connection portion;
  intake runners individually extending from the respective cylinders provided in the second bank;
  a second connection portion for connecting the intake runners connected to the second bank;
  a second common intake passage connected to the second connection portion;
  a junction portion for connecting the first and second common intake passages;
  a throttle body connected to an upstream portion end of the junction portion;
  the first and second connection portions being arranged above the first bank, the throttle body being arranged in the vicinity of a space between the first and second banks with the first and second common intake passages being curved substantially along an outside of the first bank.

15. An induction system as defined in claim 14 wherein the cylinder row of the first bank is offset relative to the cylinder row of the second bank in the cylinder arranging direction so as to provide an offset space above the first bank, the first and second common intake passages are curved so as to pass the offset space.

16. An induction system for use in an engine including a first cylinder row having a plurality of cylinders whose intake strokes are not serially continuous one after another and a second cylinder row having a plurality of cylinders whose intake strokes are not serially continuous one after another, the induction system comprising;
  intake runners individually extending from the respective cylinders of the first cylinder row;
  a first connection portion for connecting the intake runners extending from the first cylinder row;
  a first common intake passage connected to the first connection portion;
  intake runners individually extending from the respective cylinders of the second cylinder row;
  a second connection portion for connecting the intake runners extending from the second row;
  a second common intake passage connected to the second connection portion;
  a first communicating passage for communicating the first and second connection portions with each other;
  a first communication change means including a valve provided in the first communicating passage for opening or closing the communicating passage;
  a second communicating passage for cummunicating the first and second connection portions with bypassing the first valve; and
  a second communicating change means includind a valve provided in the second communicating passage for opening or closing the second communicating passage.

17. An induction system as defined in claim 16 wherein the engine is a V-shaped engine including a first bank and a second bank, the first cylinder row is provided in the first bank, the second cylinder row is provided in the second bank, and the first and second connection portions, the first and second communicating passages are arranged above one of the first and second banks.

18. An induction system as defined in claim 17 wherein the first connection portion and the second connection portion are respectively shaped into such a convergent form as to connect their respective intake runners with the same distance being held between a center of the respective connection portions and the cylinders to which the intake runners are respectively connected, the first communicating passage is provided between the center of the first connection portion and the center of the second connection portion.

* * * * *